US011669957B2

(12) United States Patent
Chen et al.

(10) Patent No.: US 11,669,957 B2
(45) Date of Patent: Jun. 6, 2023

(54) SEMICONDUCTOR WAFER MEASUREMENT METHOD AND SYSTEM

(71) Applicant: TAIWAN SEMICONDUCTOR MANUFACTURING COMPANY, LTD., Hsinchu (TW)

(72) Inventors: Peng-Ren Chen, HSinchu (TW); Yi-An Huang, Hsinchu (TW); Jyun-Hong Chen, Hsinchu (TW); Wei-Chung Hu, Hsinchu (TW); Wen-Hao Cheng, Hsinchu (TW); Shiang-Bau Wang, Hsinchu (TW); Yung-Jung Chang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 13 days.

(21) Appl. No.: 17/377,746

(22) Filed: Jul. 16, 2021

(65) Prior Publication Data

US 2021/0342994 A1 Nov. 4, 2021

Related U.S. Application Data

(63) Continuation of application No. 16/984,090, filed on Aug. 3, 2020, now Pat. No. 11,094,057, which is a (Continued)

(51) Int. Cl.
*G06T 7/00* (2017.01)
*G06V 10/75* (2022.01)

(52) U.S. Cl.
CPC ............ *G06T 7/001* (2013.01); *G06V 10/752* (2022.01); *G06T 2207/10061* (2013.01); *G06T 2207/30148* (2013.01); *G06V 2201/06* (2022.01)

(58) Field of Classification Search
CPC ..................................................... G06T 7/001
See application file for complete search history.

(56) References Cited

U.S. PATENT DOCUMENTS 6,612,159 B1 9/2003 Knutrud
7,275,227 B1 * 9/2007 Ying ........................ G03F 1/36 716/52

(Continued)

FOREIGN PATENT DOCUMENTS

DE 101 39 755 3/2002
DE 10 2004 031 877 3/2005

(Continued)

OTHER PUBLICATIONS

Office Action dated Apr. 12, 2017 from corresponding application No. KR 10-2015-0185324, all pages.

(Continued)

*Primary Examiner* — Irfan Habib
(74) *Attorney, Agent, or Firm* — Hauptman Ham, LLP

(57) ABSTRACT

A method of analyzing a semiconductor wafer includes obtaining a graphic data system (GDS) file corresponding to the semiconductor wafer, using GDS information from the GDS file to provide coordinates of a layout feature of the semiconductor wafer to an electron microscope, using the electron microscope to capture a raw image from the semiconductor wafer based on the coordinates of the layout feature, and performing a measurement operation on the raw image.

20 Claims, 9 Drawing Sheets

Assign measurement box in raw image — S410
Arrange indicators in measurement box — S420
Measure distances between indicators — S430
Provide diagnostic result according to distances — S440

400

Related U.S. Application Data continuation of application No. 16/400,833, filed on May 1, 2019, now Pat. No. 10,762,621, which is a continuation of application No. 14/858,049, filed on Sep. 18, 2015, now Pat. No. 10,304,178.

(56) References Cited

U.S. PATENT DOCUMENTS 7,455,939 B2 * 11/2008 Brunner ................. G03B 27/00 430/30
7,474,401 B2 * 1/2009 Ausschnitt .......... G03F 7/70633 430/30
7,608,468 B1 * 10/2009 Ghinovker .............. G06F 30/39 702/172
7,626,702 B2 * 12/2009 Ausschnitt .......... G03F 7/70633 356/401
7,676,078 B2 * 3/2010 Fukuhara ............ G03F 7/70591 430/311
7,804,994 B2 * 9/2010 Adel ................... G03F 7/70633 430/30
7,805,018 B2 * 9/2010 Lesellier .............. H04N 19/865 382/266
7,978,902 B2 * 7/2011 Usui ...................... G06V 10/44 702/85
8,031,329 B2 * 10/2011 Huang .................. H01L 23/544 355/53
8,046,726 B2 * 10/2011 Lakshmanan ......... G06F 30/398 716/111
8,111,900 B2 * 2/2012 Wu ....................... G03F 7/7065 382/148
8,737,676 B2 * 5/2014 Tsuchiya ............... G06T 7/0002 382/148
9,097,989 B2 * 8/2015 Ausschnitt ................ G03F 1/68
9,535,015 B2 * 1/2017 Isomura .................. G06T 7/001
9,703,919 B2 * 7/2017 Hsieh ...................... G03F 7/705
10,318,700 B2 * 6/2019 Gold ...................... G11C 29/44
10,515,444 B2 * 12/2019 Lin ....................... G06T 7/0004
10,818,001 B2 * 10/2020 Leung ................... G06T 7/0004
2005/0002554 A1 * 1/2005 Schulze .................. G06T 7/001 430/5
2014/0151551 A1 6/2014 Xiao
2014/0226893 A1 8/2014 Lo et al.
2015/0110384 A1 * 4/2015 Luoh ..................... G06T 7/0006 382/149
2015/0154746 A1 * 6/2015 Zafar ........................ G03F 1/84 382/149

FOREIGN PATENT DOCUMENTS

KR 20020016586 3/2002
KR 20150089083 8/2015

OTHER PUBLICATIONS

Office Action dated Oct. 31, 2017 from corresponding application No. TW 105129950, all pages.
German language office action dated May 11, 2016, issued in application No. DE 10 2015 118 071.5, all pages.

* cited by examiner

600

SEMICONDUCTOR WAFER MEASUREMENT METHOD AND SYSTEM

PRIORITY CLAIM

The present application is a continuation of U.S. application Ser. No. 16/984,090, filed Aug. 3, 2020, which is a continuation of U.S. application Ser. No. 16/400,833, filed May 1, 2019, now U.S. Pat. No. 10,762,621, issued Sep. 1, 2020, which is a continuation of U.S. application Ser. No. 14/858,049, filed Sep. 18, 2015, now U.S. Pat. No. 10,304,178, issued May 28, 2019, each of which is incorporated herein by reference in its entirety.

BACKGROUND

In semiconductor technology, the wafers, each having multiple chips, are produced by a plurality of processes/stages in a wafer fabrication facility (FAB). Each process/stage can introduce one or more defects into the semiconductor wafers, which leads to quality and reliability issues, failures, and yield losses. To improve manufacturing technologies and enhance wafer quality, reliability, and yield, the semiconductor wafers are measured, tested, monitored and diagnosed at each process/stage. In order to obtain accurate results, alignment is important in a measured, tested, monitored and diagnosed semiconductor wafer.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
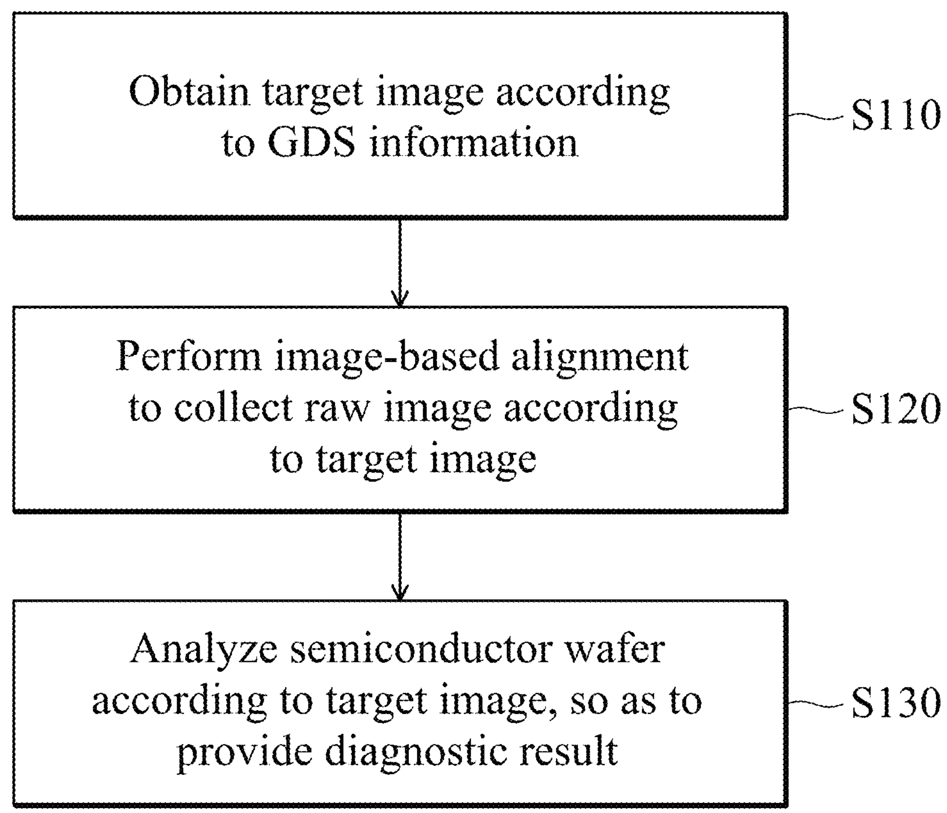
FIG. 1 shows a simplified flowchart of a method for diagnosing a semiconductor wafer, in accordance with some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

In integrated circuit (IC) design, a variety of functions are integrated into one chip, and an application specific integrated circuit (ASIC) or system on a chip (SOC) cell based design is often used. In this approach, a library of known functions is provided, and after the functional design of the device is specified by choosing and connecting these standard functions, and proper operation of the resulting circuit is verified using electronic design automation (EDA) tools, the library elements are mapped on to predefined layout cells, which contain prefigured elements such as transistors. The cells are chosen with the particular semiconductor process features and parameters in mind and create a process parameterized physical representation of the design. The design flow continues from that point by performing placement and routing of the local and global connections needed to form the completed design using the standard cells.

After design rule checks, design rule verification, timing analysis, critical path analysis, static and dynamic power analysis, and final modifications to the design, a tape out process is performed to produce photomask generation data. This photomask generation (PG) data is then used to create the optical masks used to fabricate the semiconductor device in a photolithographic process at a wafer fabrication facility (FAB). In the tape out process, the database file of the IC is converted into a Graphic Database System (GDS) file (e.g. a GDS file or a GDSII file). The GDS file is then used to make various layers of masks for integrated circuit manufacturing. Specifically, the GDS file became the industry's standard format for transfer of IC layout data between design tools of different vendors.

At present, a golden wafer is selected from a lot of wafers, and the golden wafer is used as a template wafer to measure, test, monitor or diagnose the other wafers in the lot of wafers. For example, a reference image is captured from the golden wafer, and the reference image includes information regarding contour and contrast of the golden wafer. The reference image is used to perform alignment and measurement for the other wafers, so as to verify these wafers. If a verification result is normal, the subsequent process/stage is performed for the verified wafer.

FIG. 1 shows a simplified flowchart of a method 100 for diagnosing a semiconductor wafer, in accordance with some embodiments of the disclosure. It should be noted that additional processes may be provided before, during, and/or after the method 100 of FIG. 1, and that some processes may only be briefly described herein. Furthermore, the method 100 of FIG. 1 can be performed at one or more process/stage for the semiconductor wafer.

Referring to FIG. 1, a target image is obtained according to a graphic data system (GDS) information of a specific layout of an integrated circuit (IC) (S110 of FIG. 1), and the IC will be implemented in a semiconductor wafer. In reality, as will be appreciated by persons skilled in the art, processing circuitry is utilized in the implementation of the invention, and the target image is represented by (or embodied in) an electrical signal. Thus, when it is said that the target image is obtained, it will be understood that an electrical signal embodying the target image is obtained via circuitry. The target image is a template for diagnosing the semiconductor wafer in a specific process/stage. In some embodiments, each process/stage has its own target image. Moreover, the specific layout is a fractional layout of the IC. The fractional layout includes a multi-layer structure of the IC. In some embodiments, the target image includes information regarding a pattern contour corresponding to the specific layout in the semiconductor wafer. For example, the target image includes a first contour, and the first contour has a first pattern corresponding to the specific layout.

Figure 2:
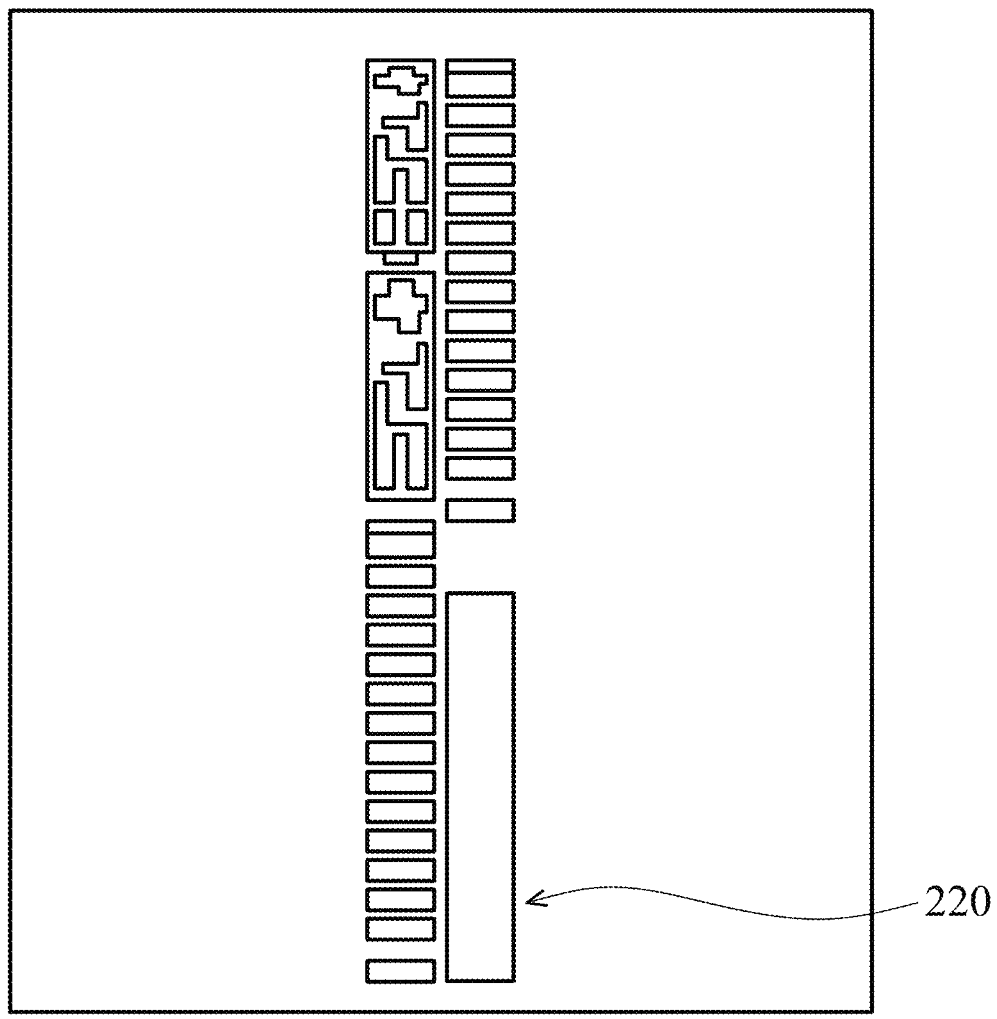
FIG. 2 shows a schematic view of a target image in one example.

FIG. 2 shows a schematic view of a target image 210 in one example. In FIG. 2, the target image 210 includes a first contour 220 having a first pattern corresponding to a specific layout. By performing image processing according to the GDS information, the first contour 220 is clear in the target image 210, and no contrast component is shown in the target image 210.

Because the first contour 220 in the target image 210 is clear and obvious, a high quality alignment image is provided according to the GDS information. For example, due to distortion of the golden wafer, a scanning electron microscope (SEM) controls the alignment weight of the contour and the contrast to obtain the reference image, such as a first weight (e.g. 30% contour+70% contrast) being modified to a second weight (e.g. 100% contour+0% contrast).

The SEM can scan a focused electron beam over a surface of the golden wafer to create the reference image. The electrons in the beam interact with the sample, producing various signals that can be used to obtain information about the surface topography and composition.

In some embodiments, various algorithms can be used to perform image processing in the first contour of the target image. Thus, the first contour of the target image will be closer to the actual situation for alignment. For example, the degree of smoothing can be modified for a line profile created from the first contour of the target image.

Referring back to FIG. 1, after obtaining the target image, an image-based alignment is performed, so as to capture a raw image from the semiconductor wafer according to the first contour of the target image (S120 of FIG. 1). For example, according to the information of target image (e.g. the contour and the related coordinates), the SEM can scan the beam across a selected area corresponding to the related coordinates, and the generated signals are recorded and thereby the raw image is formed pixel by pixel. Valuable information about morphology, surface topology and composition can be obtained in the raw image. The SEM microscopes achieving resolutions below 1 nm are available now.

In some embodiments, when the image-based alignment is performed, a second contour on the semiconductor wafer is compared with the first contour of the target image. When a second pattern of the second contour is identical to the first pattern of the first contour, the raw image having the second contour is captured from the semiconductor wafer.

After obtaining the raw image, the semiconductor wafer is diagnosed by measuring the obtained raw image, and then a diagnostic result of the semiconductor wafer is obtained (S130 of FIG. 1). In some embodiments, the diagnostic result indicates whether a feature is normal for each layer in the semiconductor wafer. If the diagnostic result is normal, the next process/stage is performed for the semiconductor wafer. Conversely, if the diagnostic result is abnormal, the current process/stage is suspended for checking.

If a SEM supports a measurement function, the SEM is capable of directly measuring the dimensions of the features in the semiconductor wafer, such as a critical dimension (CD), the widths and lengths of the metals, polys, active areas (ODs) and vias in the semiconductor wafer. For example, the SEM can capture an image according to the reference image corresponding to the golden wafer. Next, the SEM can measure the dimensions of the features in the semiconductor wafer by assigning cursors in the captured image. For example, a measuring feature is searched based on the recognition of the reference image, and the box cursors are automatically and regularly positioned in a measurement box, so as to perform auto measurement. Furthermore, the positions of the box cursors are determined according to the captured image.

Figure 3:
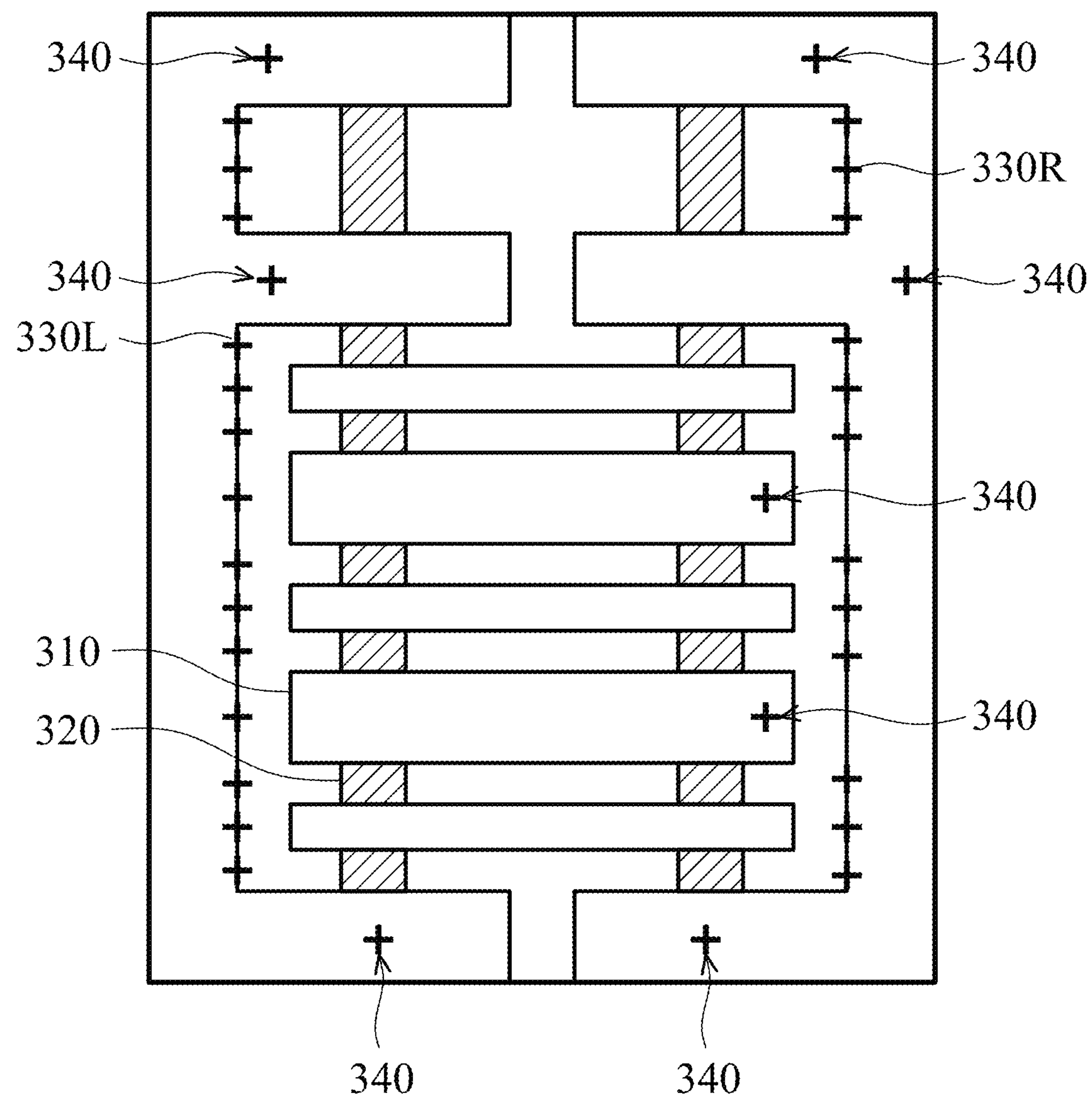
FIG. 3 shows a schematic illustrating a measurement box and a plurality of measurement cursors automatically and regularly positioned by a SEM that supports measurement function.

FIG. 3 shows a schematic illustrating a measurement box 300 and a plurality of measurement cursors automatically and regularly positioned by a SEM that supports a measurement function. In FIG. 3, two layers are observed in the measurement box 300, with a first layer 310 being disposed on a second layer 320. The measurement cursors include a plurality of pairs of cursors, and each pair of cursors is formed by a left cursor 330L and a right cursor 330R. Due to interference induced by the contrast in the measurement box 300, the measurement cursors 330L and 330R will be positioned inaccurately, e.g. the measurement cursors labeled as 340.

Figure 4:
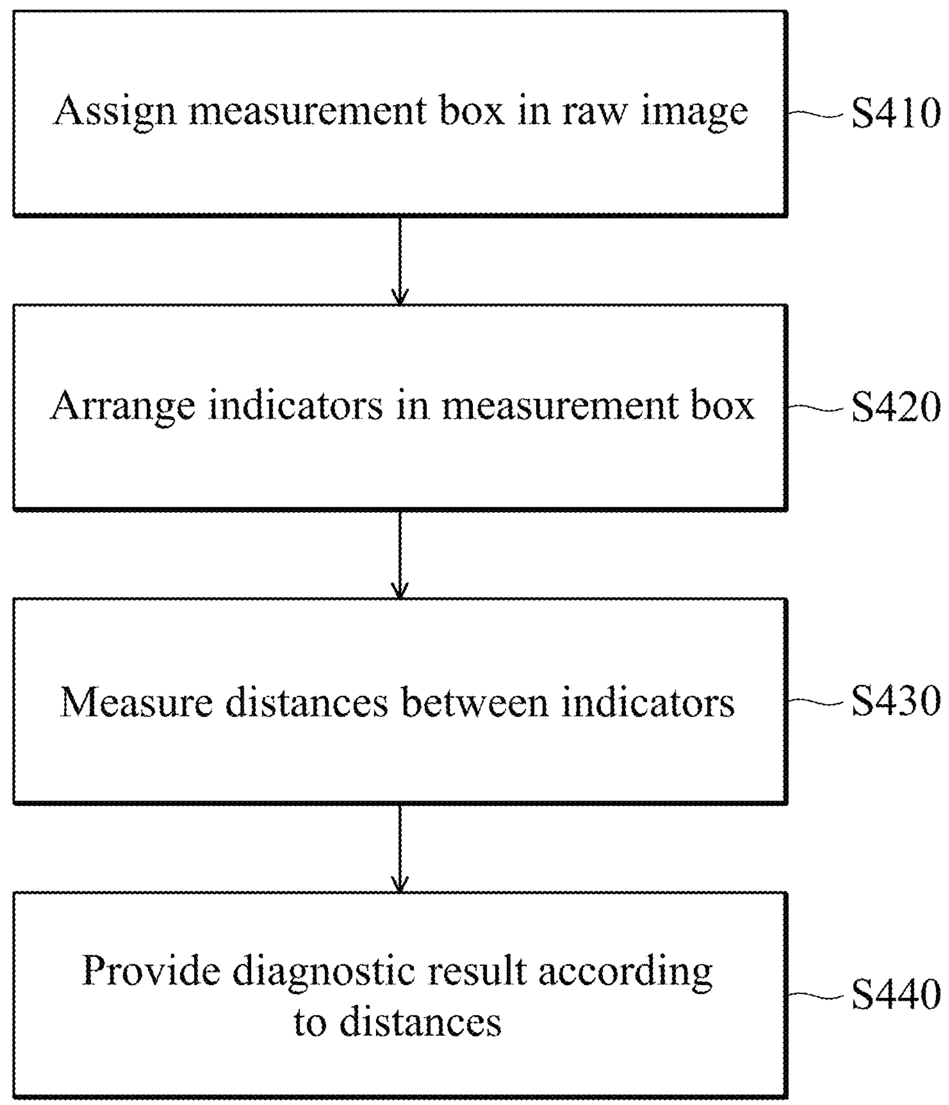
FIG. 4 shows a simplified flowchart of a method for analyzing a raw image from a semiconductor wafer according to GDS information, in accordance with some embodiments of the disclosure.

FIG. 4 shows a simplified flowchart of a method 400 for analyzing a raw image from a semiconductor wafer according to GDS information (e.g. S130 of FIG. 1), in accordance with some embodiments of the disclosure. It should be noted that additional processes may be provided before, during, and/or after the method 400 of FIG. 4, and that some processes may only be briefly described herein. Furthermore, the method 400 of FIG. 4 can be performed in one or more process/stage for the semiconductor wafer.

As mentioned above, the raw image is captured when an image-based alignment is performed according to the GDS information of the semiconductor wafer. After obtaining the raw image, a measurement box is assigned in the raw image according to the GDS information (S410 of FIG. 4). In some embodiments, for the semiconductor wafer, there are various features to be verified in the pattern of layout, and the raw image can includes more than one feature. According to the predetermined coordinates of the features, the measurement box is assigned in the raw image, so as to measure the features. A portion of the second pattern of the raw image can be viewed via the measurement box. In some embodiments, the raw image is zoomed in to assign the measurement box.

When the measurement box is assigned, a plurality of indicators is arranged/positioned in the second pattern of the raw image within the measurement box according to the GDS information (S420 of FIG. 4). Specifically, the number of indicators and positions of the indicators are determined according to the GDS information. In some embodiments, the indicators are the box cursors. Furthermore, the number of box cursors is less than the number of box cursors automatically and regularly positioned by the SEM that supports the measurement function. Fewer indicators are positioned in the measurement box, thereby reducing the interference of the measurement. Specifically, no additional indicator is positioned in the measurement box.

In some embodiments, the indicators are divided into a plurality of indicator pairs, and each indicator pair is arranged to measure a feature in the measurement box. For example, the feature to be measured in the raw image is a critical dimension (CD) of the semiconductor wafer, a width or a length of a feature of the second pattern (e.g. the width/length of conductive line), or a distance between the two features of the second pattern (e.g. the space between two conductive lines, or active area).

When the indicators are arranged in the measurement box according to the GDS information, a distance between the two indicators is measured in the measurement box (S430 of FIG. 4), so as to obtain a dimension of a portion of the second pattern in the raw image. In some embodiments, the distance between the two indicators is the CD of the semiconductor wafer, a width or a length of a feature of the second pattern in the raw image, or a distance between the two features of the second pattern in the raw image. Due to the interference induced by the large number of indicators being decreased, the distance between the two indicators can be accurately measured. Thus, measurement error is decreased.

When the distances between the indicators in the measurement box are measured completely, a diagnostic result is provided according to the measured distances (S440 of FIG. 4). In some embodiments, the diagnostic result of the raw image indicates whether the measured values are normal in the measurement box. If the diagnostic result is normal, the features are normal in the current process/stage for the semiconductor wafer, and the next process/stage may be performed. Conversely, if the diagnostic result is abnormal, the current process/stage is suspended for checking the semiconductor wafer.

Figure 5A:
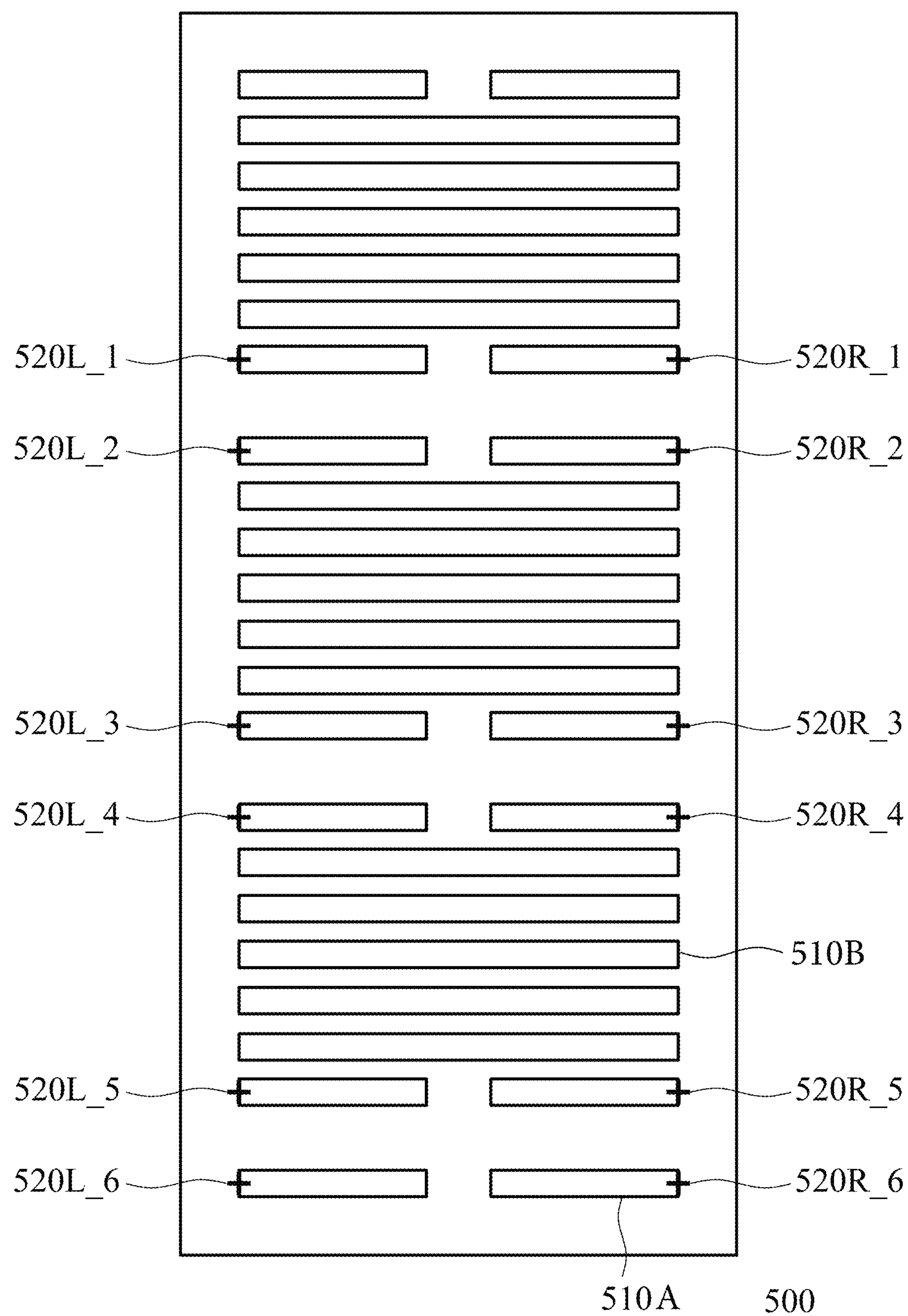
FIG. 5A shows a schematic view of a measurement box in one example.
Figure 5B:
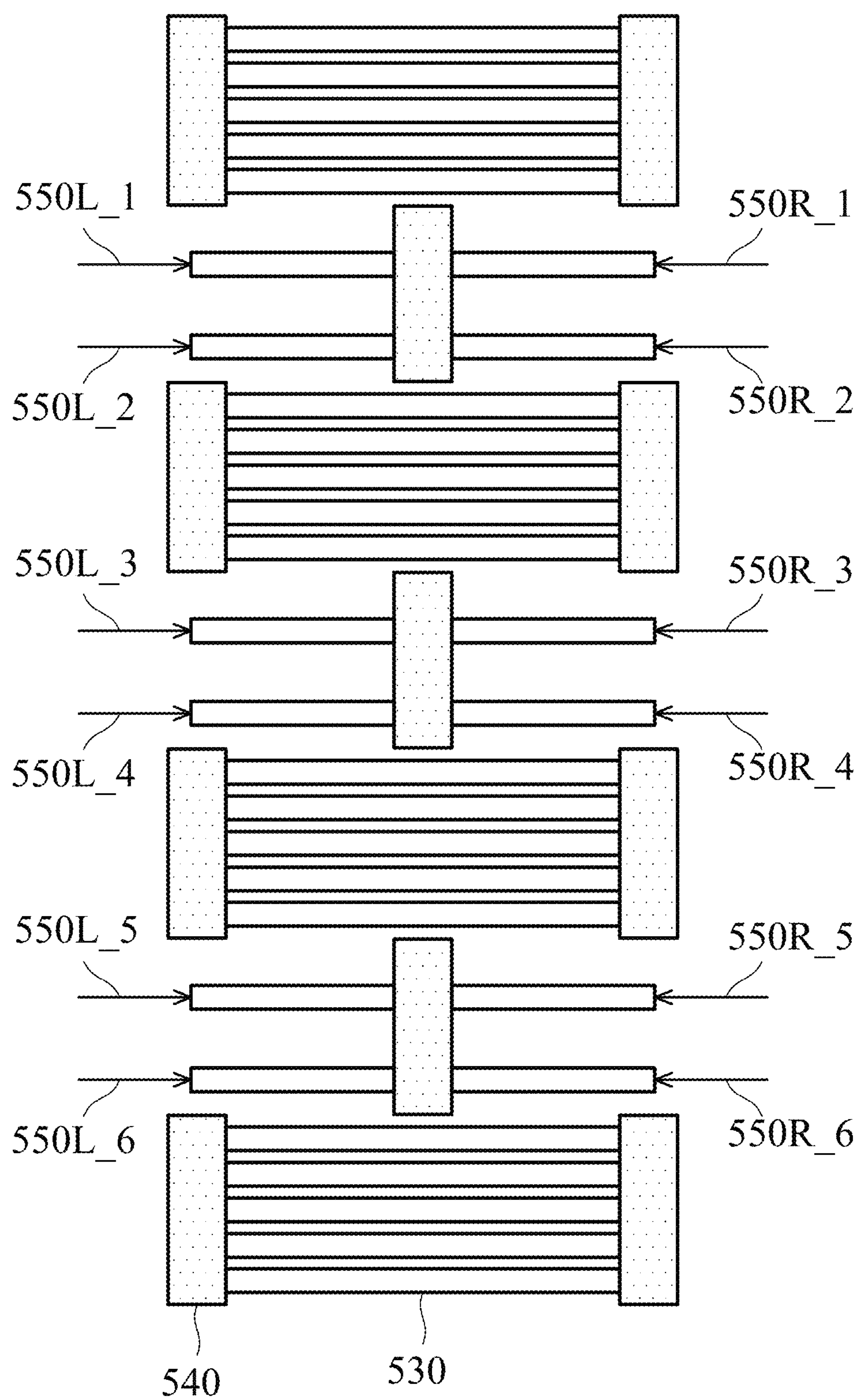
FIG. 5B shows a schematic view of GDS information of the semiconductor wafer, and the GDS information is used to captured the raw image including the measurement box of FIG. 5A from the semiconductor wafer.

FIG. 5A shows a schematic view of a measurement box 500 in one example. The measurement box 500 is obtained from a raw image captured from a semiconductor wafer. FIG. 5B shows a schematic view of GDS information of the semiconductor wafer, and the GDS information is used to capture the raw image comprising the measurement box 500 of FIG. 5A from the semiconductor wafer. In some embodiments, the raw image is captured by an image capturing mechanism (e.g. SEM) according to the GDS information of the semiconductor wafer.

A single-layer structure is shown in the measurement box 500 of FIG. 5A. In some embodiments, the single-layer structure is a portion of the second pattern in the raw image. The single-layer structure includes a plurality of conductive lines 510A and 510B, collectively 510. The conductive lines 510 can be polysilicon lines or metal lines, for example.

The GDS information of the single-layer structure of FIG. 5A is shown in FIG. 5B. In some embodiments, the GDS information includes a plurality of conductive lines 530 and a plurality of cut lines 540. For integrated circuit layouts, the conductive lines 530 are cut with a cut pattern formed by the cut lines 540, such as a cut poly (CPO) pattern.

The conductive lines 530 in the GDS information represent electrically conductive lines to be formed in a physical integrated circuit over a substrate of the semiconductor wafer. The conductive lines 530 can include polysilicon or other electrically conductive material such as metal in a metal layer. The cut lines 540 represent cut sections or patterning area where the conductive lines 530 are removed for electrical connections/disconnections according to the integrated circuit design in the current stage.

In FIG. 5A, the conductive lines 510 are divided into two groups: short lines 510A and long lines 510B. The short lines 510A are parallel to the long lines 510B, and the long lines 510B are parallel with each other. According to the GDS information of FIG. 5B, the short lines 510A in the same horizontal line are formed by arranging the cut line 540 in the middle of the corresponding conductive line 530. Furthermore, the long line 510B is formed by arranging two cut lines 540 on the both sides of the corresponding conductive line 530, respectively.

If a dimension of the conductive line 530 cut in the middle by the cut line 540 is to be measured, a first sign (e.g. 550L-1 to 550L-6) is assigned to a left side of the conductive line 530, and a second sign (e.g. 550R-1 to 550R-6) is assigned to a right side of the conductive line 530. According to the first and second signs of the GDS information, the indicators can be accurately arranged in the measurement box, so as to obtain the actual dimension in the semiconductor wafer.

In the measurement box 500 of FIG. 5A, a half of the short lines 510A are located at the left side of the measurement box 500, and a plurality of indicators 520L_1 to 520L-6 are arranged at the left side of the half of the short lines 510A according to the first signs 550L-1 to 550L-6 of FIG. 5B. Furthermore, the other half of the short lines 510A are located at the right side of the measurement box 500, and a plurality of indicators 520R_1 to 520R-6 are arranged at the right side of the half of the short lines 510A according to the second signs 550R-1 to 550R-6 in the GDS information of FIG. 5B.

For example, in the measurement box 500 of FIG. 5A, the indicator 520L_1 is arranged according to the first sign 550L_1 of FIG. 5B, and the indicator 520R_1 is arranged according to the second sign 550R_1 of FIG. 5B. The indicator 520L_5 is arranged according to the first sign 550L_5 of FIG. 5B, and the indicator 520R_5 is arranged according to the second sign 550R_5 of FIG. 5B.

In some embodiments, the indicators 520L_1 to 520L-6 and 520R_1 to 520R-6 are box cursors in the measurement box 500 of FIG. 5A. After arranging the indicators 520L_1 to 520L-6 and the indicators 520R_1 to 520R-6, the distances between the indicators 520L_1 to 520L-6 and the indicators 520R_1 to 520R-6 are measured.

By using the GDS information to assign the indicators in the measurement box, the number of indicators and positions of the indicators can be controlled in advance. Thus, the interference caused by the large number of indicators can be decreased. No additional indicator is positioned in the measurement box. Furthermore, by using the GDS information to distinguish the features, contours and patterns in the raw image, the interference induced by the contrast in the raw image also can be decreased.

Figure 6A:
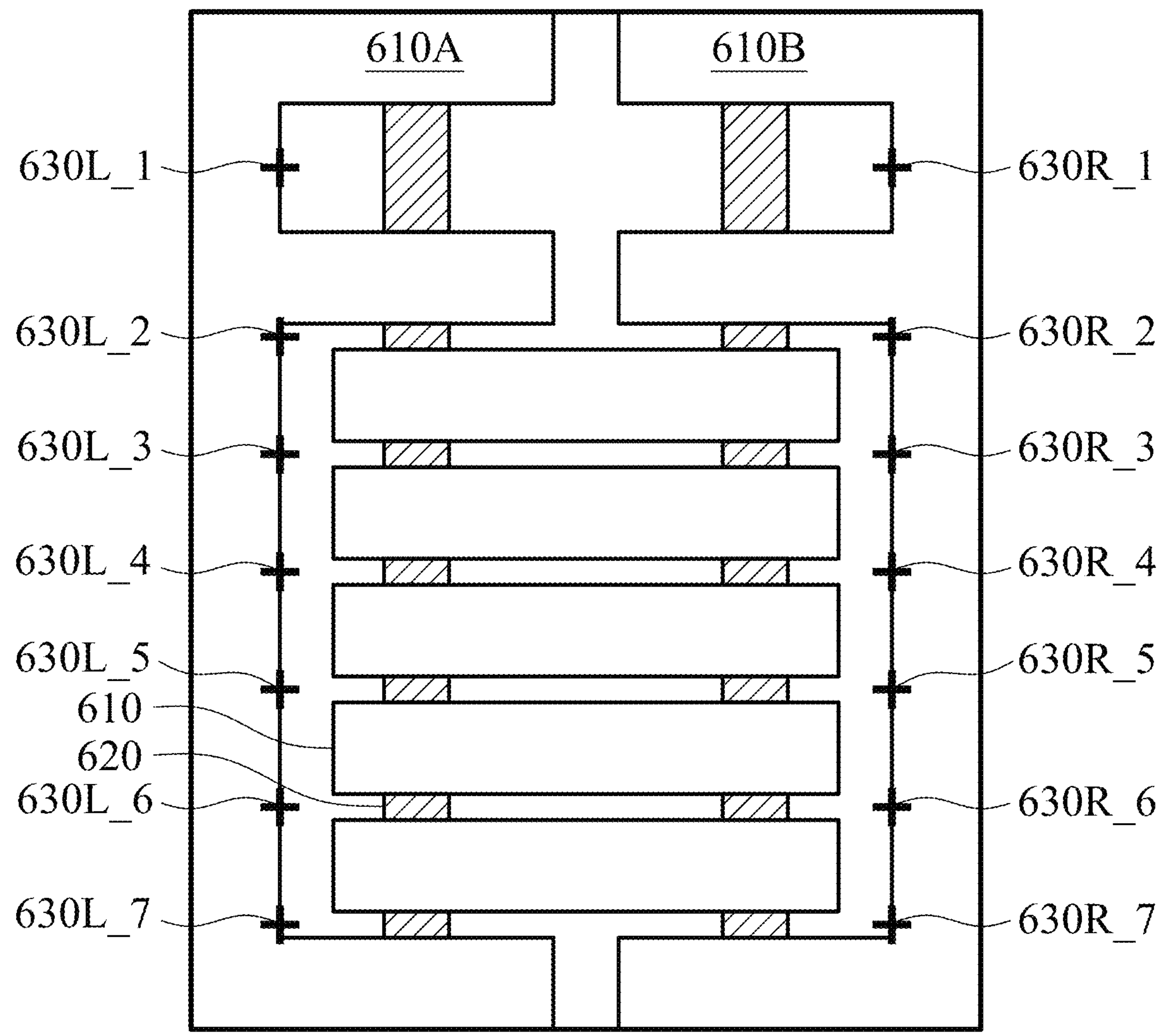
FIG. 6A shows a schematic view of a measurement box in another example.
Figure 6B:
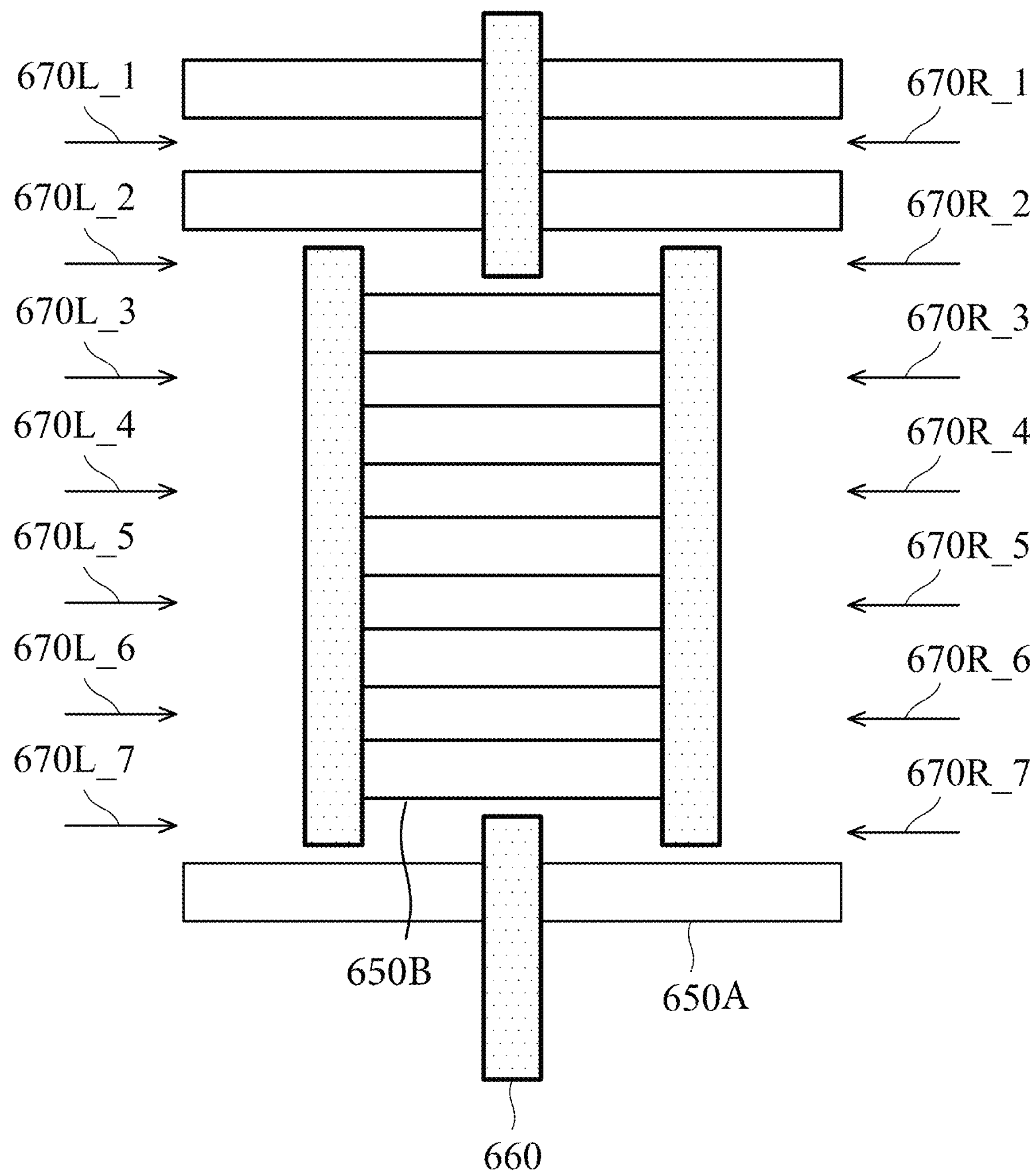
FIG. 6B shows a schematic view of GDS information of the semiconductor wafer, and the GDS information is used to captured the raw image including the measurement box of FIG. 6A from the semiconductor wafer.

FIG. 6A shows a schematic view of a measurement box 600 in another example. The measurement box 600 is obtained from a raw image captured from a semiconductor wafer. FIG. 6B shows a schematic view of GDS information of the semiconductor wafer, and the GDS information is used to capture the raw image comprising the measurement box 600 of FIG. 6A from the semiconductor wafer. In some embodiments, the raw image is captured by an image capturing mechanism (e.g. SEM) according to the GDS information of the semiconductor wafer.

A multi-layer structure is shown in the measurement box 600 of FIG. 6A. In some embodiments, the multi-layer structure is a portion of the second pattern in the raw image. The multi-layer structure includes a first layer having a plurality of conductive lines 610, and a second layer having a plurality of conductive lines 620. The first layer is disposed on the second layer, and a cross-layer structure is formed. The conductive lines 610 and 620 can be polysilicon lines and/or metal lines, for example.

The GDS information of the first layer of FIG. 6A is shown in FIG. 6B. In some embodiments, the GDS information includes a plurality of conductive lines 650A and 650B, collectively 650, and a plurality of cut lines 660. For integrated circuit layouts, the conductive lines 650 are cut with a cut pattern formed by the cut lines 660.

The conductive lines 650 in the GDS information represent electrically conductive lines to be formed in a physical integrated circuit over a substrate of the semiconductor wafer. The conductive lines 650 can include polysilicon or other electrically conductive material such as metal in a metal layer. The cut lines 660 represent cut sections or patterning area where the conductive lines 650 are removed for electrical connections/disconnections according to the integrated circuit design in the current stage.

In FIG. 6A, the conductive lines 650 are divided into two groups: outer lines 650A and inner lines 650B. The inner lines 650B are parallel to each other, and the inner lines 650B are surrounded by the outer lines 650A. According to the GDS information of FIG. 6B, the outer lines 650A are formed by arranging the cut line 660 in the middle of the corresponding conductive line 650. Furthermore, the inner lines are formed by arranging two cut lines 660 on both sides of the corresponding conductive lines 650, respectively.

According to the GDS information of FIG. 6B, a first sign (e.g. 670L-1 to 670L-7) is assigned at the left side of the conductive lines 650, and a second sign (e.g. 670R-1 to 670R-7) is assigned at the right side of the conductive lines 650. According to the first and second signs of the GDS information, the indicators can be accurately arranged in the measurement box, so as to obtain the actual dimensions in the semiconductor wafer.

In the measurement box 600 of FIG. 6A, a portion of conductive lines 610 form a first pattern (labeled as 610A). The first pattern of conductive lines 610 is located at the left side of the measurement box 600, and a plurality of indicators 630L_1 to 630L-7 are arranged at the edge of the first pattern according to the first signs 670L_1 to 670L-7 in the GDS information of FIG. 6B.

In the measurement box 600 of FIG. 6A, a portion of conductive lines 610 form a second pattern (labeled as 610B), and the second pattern is opposite from the first pattern. The second pattern of conductive lines 610 is located at the right side of the measurement box 600, and a plurality of indicators 630R_1 to 630R-7 are arranged at the edge of the second pattern according to the second signs 670R_1 to 670R-7 in the GDS information of FIG. 6B.

For example, in the measurement box 600 of FIG. 6A, the indicator 630L_1 is arranged according to the first sign 670L_1 of FIG. 6B, and the indicator 630R_1 is arranged according to the second sign 670R_1 of FIG. 6B. The indicator 630L_4 is arranged according to the first sign 670L_4 of FIG. 6B, and the indicator 630R_4 is arranged according to the second sign 670R_4 of FIG. 6B.

In some embodiments, the indicators 630L_1 to 630L-7 and the indicators 630R_1 to 630R-7 are box cursors in the measurement box 600 of FIG. 6A. After arranging the indicators 630L_1 to 630L-7 and the indicators 630R_1 to 630R-7, the distances between the indicators 630L_1 to 630L-7 and the indicators 630R_1 to 630R-7 are measured.

Figure 7:
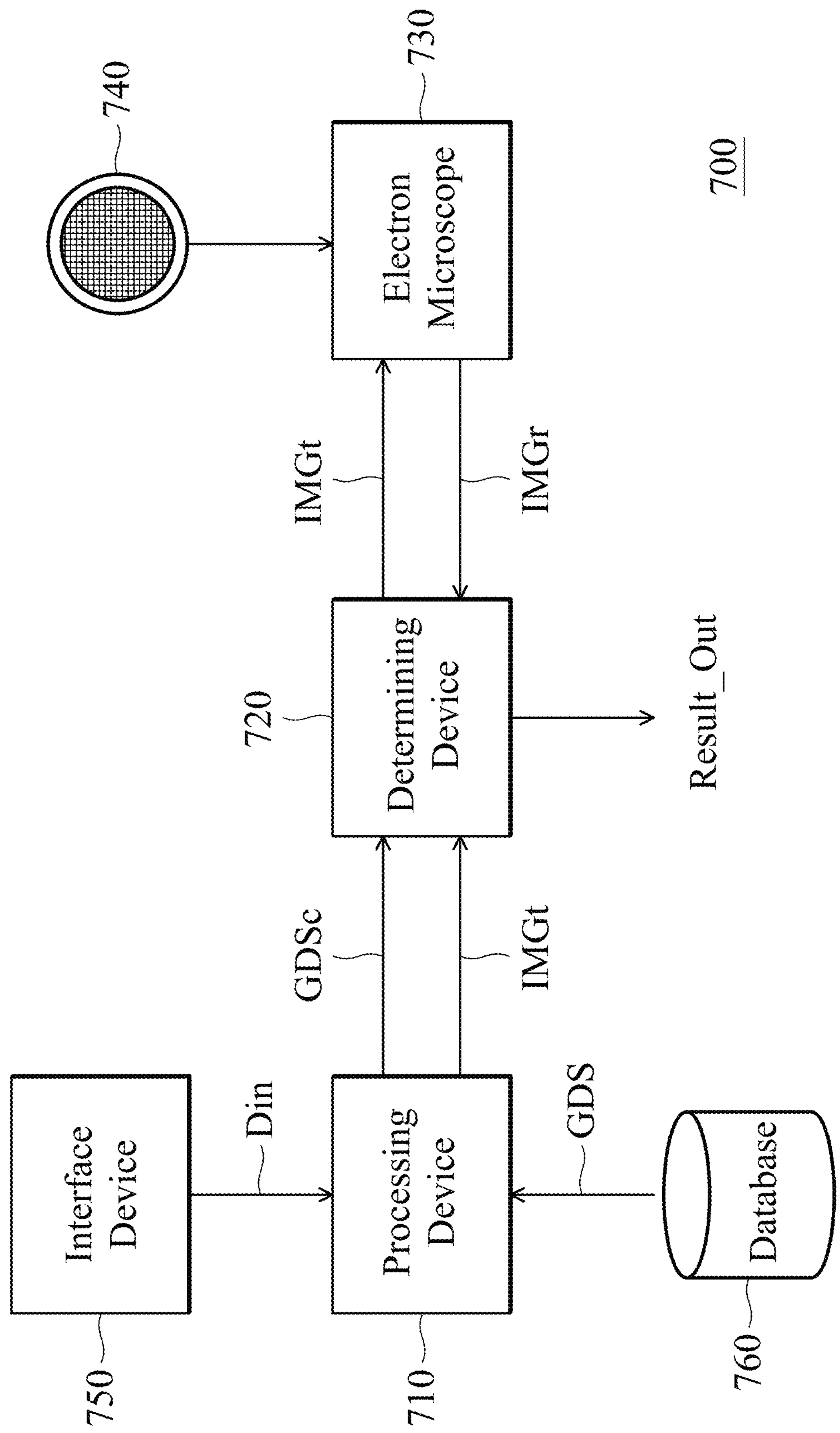
FIG. 7 shows a simplified diagram of a system 700 for diagnosing a semiconductor wafer, in accordance with some embodiments of the disclosure.

FIG. 7 shows a simplified diagram of a system 700 for diagnosing a semiconductor wafer, in accordance with some embodiments of the disclosure. The system 700 includes a processing device (e.g., circuitry) 710, a determining device (e.g., circuitry) 720, and an electron microscope 730.

A plurality of IC will be implemented in the semiconductor wafer 740 via various processes/stages at a wafer fabrication facility. When each process/stage is performed, the semiconductor wafer 740 will be verified and diagnosed via the system 700.

The semiconductor wafer 740 to be diagnosed is loaded in the electron microscope 730. In some embodiments, the electron microscope 730 can be an image capturing mechanism, and the image capturing mechanism is capable of capturing a raw image from the semiconductor wafer 740.

In some embodiments, the system 700 further includes an interface device 750, and a database 760.

The processing device 710 can obtain a graphic database system file GDS of the IC to be implemented in the semiconductor wafer 740. In some embodiments, the file GDS is obtained from the database 760. In some embodiments, the file GDS is obtained from a remote server.

Furthermore, the processing device 710 can further obtain a user input Din from the interface device 750. In some embodiments, the user input Din includes information regarding coordinates and patterns in the layout of the IC.

In the system 700, the processing device 710 can obtain GDS information in the file GDS. In response to the information of the user input Din, the processing device 710 can clip the GDS information to provide a target image IMGt, thereby providing increased flexibility based on improvement in handling customized requirements. In some embodiments, the target image IMGt includes a first contour having a first pattern corresponding to a specific layout of the IC, and the specific layout includes a multi-layer structure. In some embodiments, the processing device 710 can provide the clipped GDS information GDSc corresponding to the target image IMGt. In some embodiments, the clipped GDS information GDSc includes the information (e.g. the first and second signs) regarding the indicators to be assigned in a measurement box.

In some embodiments, the file GDS includes layout information about each layer of the IC of the semiconductor wafer 740. The processing device 710 can provide the target images IMGt for the corresponding layer of the semiconductor wafer 740.

The target images IMGt include little layout information, thus it is difficult to effectively and sufficiently gather information from the target images IMGt. Therefore, information regarding circuit design and circuit layout of the IC can be kept secret.

In some embodiments, the processing device 710 can provide the target images IMGt to the electron microscope 730 via the determining device 720. In some embodiments, the processing device 710 can directly provide the target images IMGt to electron microscope 730 without passing through the determining device 720.

According to the first contour of the target images IMGt, the electron microscope 730 can perform image-based alignment to capture a raw image IMGr from the loaded semiconductor wafer 740. As mentioned above, the raw image IMGr includes a second contour in the semiconductor wafer 740, and the second contour matches the first contour of the target images IMGt.

In some embodiments, the contours of the semiconductor wafer are compared with the first contour of the target images IMGt. If a second pattern of the second contour is identical to the first pattern of the first contour, the raw image IMGr having the second contour is captured from the semiconductor wafer 740.

After capturing the raw image IMGr, the electron microscope 730 outputs the raw image IMGr to the determining device 720. Compared with a SEM supporting measurement function in an on-line manner, the determining device 720 is capable of provide an off-line measurement for the semiconductor wafer 740.

After obtaining the raw image IMGr, the determining device 720 can assign a measurement box in the raw image IMGr. The determining device 720 can arrange the indicators in the measurement box according to the clipped GDS information GDSc, as mentioned above.

After the indicators are positioned, the determining device 720 can measure the distances between the indicators, and the dimensions of a portion of the second pattern are obtained. In some embodiments, the dimension of the portion of the second pattern is a critical dimension of the semiconductor wafer, a width or a length of a first feature of the second pattern (e.g. the width/length of conductive line), or a distance between the first feature and a second feature of the second pattern (e.g. the space between two conductive lines, or active area).

According to the measured dimensions, the determining device 720 can provide a diagnostic result Result_Out. In some embodiments, the diagnostic result Result_Out indicates whether the dimension of the portion of the second pattern is normal.

If the diagnostic result Result_Out is normal, the features of the semiconductor wafer 740 are normal in the current process/stage for the semiconductor wafer. In response to the diagnostic result Result_Out, the electron microscope 730 may unload the semiconductor wafer 740 to perform subsequent processes/stages. Conversely, if the diagnostic result Result_Out is abnormal, i.e. measure failure, the current process/stage is suspended for checking the semiconductor wafer 740.

Embodiments for diagnosing a semiconductor wafer are provided. A target image is obtained according to GDS information of the semiconductor wafer. An image-based alignment is performed according to the target image, and a raw image is captured. The raw image includes a second contour corresponding to a first contour of the target image. The raw image is measured in an off-line manner. A measurement box is assigned in the raw image according to the GDS information. A plurality of indicators is arranged in the features within the measurement box. A diagnostic result is provided according to the dimensions of the features for the semiconductor wafer. The dimension of the feature can be a critical dimension of the semiconductor wafer, a width or a length of the feature (e.g. the width/length of conductive line), or a distance from the feature to the other feature (e.g. the space between two conductive lines, or active area).

By using the GDS information to perform alignment and measurement for the semiconductor chip, a high quality image with good contrast is used as a reference image to capture the raw image from the semiconductor chip. Thus, failure rate is decreased for alignment, and tooling time of the image capturing mechanism can be decreased. Furthermore, measurement is accurate by assigning the indicators in the measurement box according to the GDS information. Thus, process capability index (CPK) is stable, and manufacturing cost (e.g. manpower and tooling time) is decreased.

In some embodiments, a method of analyzing a semiconductor wafer includes obtaining a GDS file corresponding to the semiconductor wafer, using GDS information from the GDS file to provide coordinates of a layout feature of the semiconductor wafer to an electron microscope, using the electron microscope to capture a raw image from the semiconductor wafer based on the coordinates of the layout feature, and performing a measurement operation on the raw image. In some embodiments, using the electron microscope to capture the raw image includes performing a scan across a selected area corresponding to the coordinates of the layout feature. In some embodiments, the GDS information includes a target image corresponding to the coordinates of the layout feature, and using the electron microscope to capture the raw image includes performing an image-based alignment by determining that a contour on the semiconductor wafer matches a contour of the target image. In some embodiments, the GDS file includes layout information corresponding to a plurality of layers of the semiconductor wafer, and the target image corresponds to a layer of the plurality of layers. In some embodiments, performing the measurement operation on the raw image includes assigning a measurement box in the raw image according to the coordinates of the layout feature. In some embodiments, performing the measurement operation on the raw image includes arranging a plurality of indicators within the measurement box according to the GDS information. In some embodiments, the method includes performing or suspending a manufacturing process on the semiconductor wafer based on a diagnostic result of the measurement operation.

In some embodiments, a method of analyzing a semiconductor wafer includes obtaining a GDS file corresponding to the semiconductor wafer, obtaining user input related to coordinates of a layout feature of the semiconductor wafer, based on the user input, providing GDS information from the GDS file to an electron microscope, the GDS information comprising the coordinates of the layout feature, using the electron microscope to capture a raw image from the semiconductor wafer based on the coordinates of the layout feature, and performing a measurement operation on the raw image. In some embodiments, obtaining the GDS file includes obtaining the GDS file from a database or a remote server. In some embodiments, providing the GDS information to the electron microscope includes, based on the user input, clipping the GDS information to obtain a target image corresponding to the coordinates of the layout feature, and using the electron microscope to capture the raw image includes performing an image-based alignment by determining that a contour on the semiconductor wafer matches a contour of the target image. In some embodiments, the GDS file includes layout information corresponding to a plurality of layers of the semiconductor wafer, and obtaining the target image includes the target image corresponding to a layer of the plurality of layers. In some embodiments, the contour of the target image has a rectangular shape. In some embodiments, performing the measurement operation on the raw image includes assigning a measurement box in the raw image according to the coordinates of the layout feature, and arranging a plurality of indicators within the measurement box according to the GDS information. In some embodiments, arranging the plurality of indicators within the measurement box is based on the user input.

In some embodiments, a semiconductor wafer analysis system includes processing circuitry configured to obtain a GDS file corresponding to a semiconductor wafer and use GDS information from the GDS file to output coordinates of a layout feature of the semiconductor wafer, an electron microscope configured to capture a raw image from the semiconductor wafer based on the coordinates of the layout feature received from the processing circuitry, and determining circuitry configured to perform a measurement operation on the raw image. In some embodiments, the processing circuitry is configured to obtain the GDS file from a remote server. In some embodiments, the processing circuitry is configured to obtain a user input from an interface device, and, based on the user input, clip the GDS information to provide a target image, and the electron microscope is configured to capture the raw image by performing an image-based alignment by determining that a contour on the semiconductor wafer matches a contour of the target image. In some embodiments, the determining circuitry is configured to perform the measurement operation by assigning a measurement box in the raw image according to the coordinates of the layout feature, and arranging a plurality of indicators within the measurement box according to the GDS information. In some embodiments, the determining circuitry is configured to perform the measurement operation on the raw image in an off-line manner. In some embodiments, the determining circuitry is further configured to output a diagnostic result indicator based on the measurement operation.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuity in accordance with the functions and operations described herein. As will be further appreciated, the specific structure or interconnections of the transistors will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for it role and use in the facilitation of the design process of electronic and digital systems.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of analyzing a semiconductor wafer, the method comprising:

obtaining a graphic data system (GDS) file corresponding to the semiconductor wafer;

using GDS information from the GDS file to provide coordinates of a layout feature of the semiconductor wafer to an electron microscope, wherein the layout feature comprises one or more of a width or length of a pattern feature or a distance between two pattern features;

using the electron microscope to capture a raw image from the semiconductor wafer based on the coordinates of the layout feature; and performing a measurement operation on the raw image.

2. The method of claim 1, wherein the using the electron microscope to capture the raw image comprises performing a scan across a selected area corresponding to the coordinates of the layout feature.

3. The method of claim 1, wherein the GDS information comprises a target image corresponding to the coordinates of the layout feature, and the using the electron microscope to capture the raw image comprises performing an image-based alignment by determining that a contour on the semiconductor wafer matches a contour of the target image.

4. The method of claim 3, wherein the GDS file comprises layout information corresponding to a plurality of layers of the semiconductor wafer, and the target image corresponds to a layer of the plurality of layers.

5. The method of claim 1, wherein the performing the measurement operation on the raw image comprises assigning a measurement box in the raw image according to the coordinates of the layout feature.

6. The method of claim 5, wherein the performing the measurement operation on the raw image further comprises arranging a plurality of indicators within the measurement box according to the GDS information.

7. The method of claim 1, further comprising performing or suspending a manufacturing process on the semiconductor wafer based on a diagnostic result of the measurement operation.

8. A method of analyzing a semiconductor wafer, the method comprising:

obtaining a graphic data system (GDS) file corresponding to the semiconductor wafer;

obtaining user input related to coordinates of a layout feature of the semiconductor wafer, wherein the layout feature comprises one or more of a width or length of a pattern feature or a distance between two pattern features;

based on the user input, providing GDS information from the GDS file to an electron microscope, the GDS information comprising the coordinates of the layout feature;

using the electron microscope to capture a raw image from the semiconductor wafer based on the coordinates of the layout feature; and performing a measurement operation on the raw image.

9. The method of claim 8, wherein the obtaining the GDS file comprises obtaining the GDS file from a database or a remote server.

10. The method of claim 8, wherein the providing the GDS information to the electron microscope comprises, based on the user input, clipping the GDS information to obtain a target image corresponding to the coordinates of the layout feature, and the using the electron microscope to capture the raw image comprises performing an image-based alignment by determining that a contour on the semiconductor wafer matches a contour of the target image.

11. The method of claim 10, wherein the GDS file comprises layout information corresponding to a plurality of layers of the semiconductor wafer, and the obtaining the target image comprises the target image corresponding to a layer of the plurality of layers.

12. The method of claim 10, wherein the contour of the target image has a rectangular shape.

13. The method of claim 8, wherein the performing the measurement operation on the raw image comprises:

assigning a measurement box in the raw image according to the coordinates of the layout feature; and arranging a plurality of indicators within the measurement box according to the GDS information.

14. The method of claim 13, wherein the arranging the plurality of indicators within the measurement box is based on the user input.

15. A semiconductor wafer analysis system, the system comprising:

processing circuitry configured to:

obtain a graphic data system (GDS) file corresponding to a semiconductor wafer; and use GDS information from the GDS file to output coordinates of a layout feature of the semiconductor wafer, wherein the layout feature comprises one or more of a width or length of a pattern feature or a distance between two pattern features;

an electron microscope configured to capture a raw image from the semiconductor wafer based on the coordinates of the layout feature received from the processing circuitry; and determining circuitry configured to perform a measurement operation on the raw image.

16. The system of claim 15, wherein the processing circuitry is configured to obtain the GDS file from a remote server.

17. The system of claim 15, wherein the processing circuitry is configured to obtain a user input from an interface device, and, based on the user input, clip the GDS information to provide a target image, and the electron microscope is configured to capture the raw image by performing an image-based alignment by determining that a contour on the semiconductor wafer matches a contour of the target image.

18. The system of claim 15, wherein the determining circuitry is configured to perform the measurement operation by assigning a measurement box in the raw image according to the coordinates of the layout feature, and arranging a plurality of indicators within the measurement box according to the GDS information.

19. The system of claim 15, wherein the determining circuitry is configured to perform the measurement operation on the raw image in an off-line manner.

20. The system of claim 15, wherein the determining circuitry is further configured to output a diagnostic result indicator based on the measurement operation.

* * * * *